United States Patent
Biehn et al.

(10) Patent No.: US 11,311,839 B1
(45) Date of Patent: Apr. 26, 2022

(54) SYSTEMS AND METHOD FOR $SO_3$ MITIGATION AT HIGH TEMPERATURE INJECTION LOCATIONS

(71) Applicant: Mississippi Lime Company, St. Louis, MO (US)

(72) Inventors: Curt Biehn, O'Fallon, IL (US); Randy Griffard, St. Mary, MO (US); Mark DeGenova, Ste. Genevieve, MO (US); Eric Van Rens, Ballwin, MO (US); Pat Mongoven, Lake St. Louis, MO (US)

(73) Assignee: Mississippi Lime Company, St. Louis, MO (US)

( * ) Notice: Subject to any disclaimer, the term of this patent is extended or adjusted under 35 U.S.C. 154(b) by 0 days.

(21) Appl. No.: 14/846,484

(22) Filed: Sep. 4, 2015

Related U.S. Application Data (60) Provisional application No. 62/046,703, filed on Sep. 5, 2014.

(51) Int. Cl.
*B01D 53/50* (2006.01)
*B01D 53/75* (2006.01)

(52) U.S. Cl.
CPC ......... *B01D 53/508* (2013.01); *B01D 53/75* (2013.01); *B01D 2251/404* (2013.01); *B01D 2251/604* (2013.01)

(58) Field of Classification Search
None
See application file for complete search history.

(56) References Cited

U.S. PATENT DOCUMENTS

| | | | | |
|---|---|---|---|---|
| 4,595,576 A | * | 6/1986 | Andreasen | B01D 53/34 423/166 |
| 4,696,804 A | * | 9/1987 | Shinoda | B01D 53/501 423/243.08 |
| 2003/0019356 A1 | * | 1/2003 | Herden | B01D 53/12 95/108 |
| 2004/0109807 A1 | * | 6/2004 | D'Alesandro | B01D 53/501 423/243.08 |
| 2009/0220411 A1 | * | 9/2009 | Benson | B01D 53/40 423/636 |
| 2009/0246117 A1 | * | 10/2009 | Tilquin | B01D 53/508 423/640 |
| 2011/0014106 A1 | * | 1/2011 | Pfeffer | B01D 53/10 423/244.08 |
| 2012/0251423 A1 | * | 10/2012 | Allebach | B01D 53/40 423/240 S |
| 2013/0034481 A1 | * | 2/2013 | Dillon | B01D 53/10 423/210 |
| 2013/0156665 A1 | * | 6/2013 | Jankura | B01D 53/505 423/210 |

(Continued)

OTHER PUBLICATIONS

"Technical Flue Gas Treament," British Lime Association (BLA) part of the Mineral Products Association, pp. 1-2, available at http://www.britishlime.org/technical/flue_gas_treatment.php Sep. 2, 2015.

*Primary Examiner* — Sheng H Davis
(74) *Attorney, Agent, or Firm* — Lewis Rice LLC (57) ABSTRACT

Systems and methods for the use of highly reactive hydrated lime (HRH) in high temperature flue gas streams, namely those at greater than 400° F., such as are present before an air preheater (APH) to remove sulfur trioxide ($SO_3$) from the flue gas.

18 Claims, 3 Drawing Sheets

(56) References Cited

U.S. PATENT DOCUMENTS

2013/0309157 A1* 11/2013 Sjostrom ............... B01D 53/64
423/242.1
2015/0139882 A1* 5/2015 Warren ............... B01D 53/508
423/244.07

* cited by examiner

SYSTEMS AND METHOD FOR SO₃ MITIGATION AT HIGH TEMPERATURE INJECTION LOCATIONS

CROSS REFERENCE TO RELATED APPLICATION(S)

This application claims the benefit of U.S. Provisional Patent Application Ser. No. 62/046,703, filed Sep. 5, 2014. The entire disclosure of all the above documents is herein incorporated by reference.

BACKGROUND OF THE INVENTION

1. Field of the Invention

The invention relates generally to air pollution control processes aimed at controlling acid gases that are emitted from industrial, utility, incineration, or metallurgical process. Specifically the invention concerns the mitigation of sulfur trioxide ($SO_3$) using a high reactivity calcium hydroxide (hydrated lime) at high temperature (greater than 400° F.) injection locations.

2. Description of the Related Art

Many efforts have been made to develop materials for improved capability of cleaning or "scrubbing" flue gas or combustion exhaust. Most of the interest in such scrubbing of flue gas is to eliminate particular compositions, specifically acid gases, that contribute to particularly detrimental known environmental effects, such as acid rain.

Flue gases are generally very complex chemical mixtures which comprise a number of different compositions in different percentages depending on the material being combusted, the type of combustion being performed, impurities present in the combustion process, and specifics of the flue design. However, the release of certain chemicals into the atmosphere which commonly appear in flue gases is undesirable, and therefore their release is generally regulated by governments and controlled by those who perform the combustion.

Some of the chemicals that are subject to regulation are certain acid gases. A large number of acid gases are desired to be, and are, under controlled emission standards in the United States and other countries. This includes compounds such as, but not limited to, hydrogen chloride (HCl), sulfur dioxide ($SO_2$) and sulfur trioxide ($SO_3$). Sulfur trioxide can evidence itself as condensable particulate in the form of sulfuric acid ($H_2SO_4$). Condensable particulate can also be a regulated emission.

Flue gas exhaust mitigation is generally performed by devices called "scrubbers". Scrubbers introduce chemical compounds into the flue gas. The compounds then react with the undesirable compounds which are intended to be removed. Through these reactions, the undesirable compounds are either captured and disposed of, or turned into a less harmful compound prior to their exhaust, or both. In addition to controlling the emissions for environmental reasons, it is desirable for many combustion plant operators to remove acid gases from the plant's flue gas to prevent the acid gases from forming powerful corroding compounds which can damage flues and other equipment.

These acid gases can arise from a number of different combustion materials, but are fairly common in fossil fuel combustion (such as oil or coal) due to sulfur being present as a common contaminant in the raw fuel. Most fossil fuels contain some quantity of sulfur. During combustion, sulfur in the fossil fuel can oxidize to form sulfur oxides. A majority of these oxides forms sulfur dioxide ($SO_2$), but a small amount of sulfur trioxide ($SO_3$) can also be formed. Selective Catalyst Reduction (SCR) equipment, commonly installed for the removal of nitrogen oxides ($NO_x$), will also oxidize a portion of the $SO_2$ in a flue gas to $SO_3$. Other components of the process (e.g. iron) can increase the amount of $SO_3$ that forms in the flue gas. Particularly in coal combustion, where the chemical properties of the coal are often highly dependent on where it is mined, the ability to mitigate the amount of sulfur oxides in flue gas is highly desirable as it allows for lower quality raw coal (which may be less expensive to produce and more abundant) to be burned sufficiently cleanly to lessen environmental impact and impact on machinery.

$SO_2$ is a gas that contributes to acid rain and regional haze. Since the 1970's, clean air regulations have been designed to reduce emissions of $SO_2$ from industrial processes at great benefit to the environment and human health. For large emitters, the use of wet and dry scrubbing has led to the reduction of $SO_2$. Smaller emitters, however, seek out less costly capital investment to control $SO_2$ emissions in order to remain operating and produce electricity or steam. Similarly, halides in fossil fuels (such as chlorine and fluorine) are combusted and form their corresponding acid in the flue gas emissions. The halogenated acids also contribute to corrosion of internal equipment or, uncaptured, pollute the air via stack emissions.

However, mitigation of the above undesirable compounds can be very difficult. Because of the required throughput of a power generation facility, flue gases often move through the flue very fast and thus are present in the area of scrubbers for only a short period of time. Further, many scrubbing materials often present their own problems. Specifically, having too much of the scrubbing material could cause problems with the plant's operation from the scrubber material clogging other components or building up on moving parts.

Flue gas treatment has become a focus of electric utilities and industrial operations due to increasingly tighter air quality standards. As companies seek to comply with air quality regulations, the need arises for effective flue gas treatment options. Alkali species based on alkali or alkaline earth metals are common sorbents used to neutralize the acid components of the flue gas. The most common of these alkalis are sodium, calcium, or magnesium-based. A common method of introduction of the sorbents into the gas stream is to use dry sorbent injection. The sorbents are prepared as a fine or coarse powder and transported and stored at the use site. Dry sorbent injection systems pneumatically convey powdered sorbents to form a fine powder dispersion in the duct. The dry sorbent neutralizes $SO_3$/$H_2SO_4$, and protects equipment from corrosion while eliminating acid gas emissions. Common sorbents used are sodium (trona or sodium bicarbonate) or calcium (hydrated lime or $Ca(OH)_2$) based.

One commonly used material for the scrubbing of acid gases is hydrated lime. It has been established that hydrated lime can provide a desirable reaction to act as a mitigation agent. Hydrated lime reacts with $SO_3$ to form calcium sulfate in accordance with the following equation:

Hydrated lime systems have been proven successful in many full scale operations. These systems operate continuously to provide utility companies with a dependable, cost-effective means of acid gas control.

These hydrated lime compositions specifically focus on high surface area based on the theories of Stephen Brunauer, Paul Hugh Emmett, and Edward Teller (commonly called the BET theory and discussed in S. Brunauer, P. H. Emmett and E. Teller, J. Am. Chem. Soc., 1938, 60, 309, the entire disclosure of which is herein incorporated by reference). This methodology particularly focuses on the available surface area of a solid for absorbing gases—recognizing that a surface, in such circumstances, can be increased by the presence of pores and related structures. The most effective hydrated lime sorbents for dry sorbent injection have high (greater than 20 $m^2/g$) BET surface area.

Two examples of such compositions with increased BET surface areas are described in U.S. Pat. Nos. 5,492,685 and 7,744,678, the entire disclosures of which are herein incorporated by reference. Because of this, commercially available products are currently focused on obtaining lime hydrate with particularly high BET surface areas. It is generally believed that the BET surface area needs to be above 20 $m^2/g$ to be effective and, in many recent hydrated lime compositions, the BET surface area is above 30 $m^2/g$ in an attempt to continue to improve efficiency. These sorbents offer good conveying characteristics and good dispersion in the flue gas, which is necessary for high removal rates. Use of a higher quality, high reactivity source of hydrated lime allows for better stoichiometric ratios than previous attempts that utilized lower quality hydrated lime originally targeted for other industries such as wastewater treatment, construction, asphalt, and the like.

The reaction of hydrated lime with acid gas (such as $SO_3$) is generally assumed to follow the diffusion mechanism. The acid gas removal is the diffusion of $SO_3$ from the bulk gas to the sorbent particles. Thus, high surface area does not itself warrant a prediction in improved removals of acid gases. Specifically, high pore volume of large pores is generally believed to be required to minimize the pore plugging effect and therefore BET surface area has been determined to be a reasonable proxy for effectiveness of lime hydrates in removal of acid gases. Conventional wisdom also indicates that smaller particles act as better sorbents.

Lime hydrate meeting the above described characteristics, properties, and reactivity has generally been manufactured according to a commonly known and utilized process. First, a lime feed of primarily calcium oxide (commonly known as quicklime) is continuously grinded using a pulverizing mill until a certain percentage of all the ground particles meet a desired size (e.g., 95% or smaller than 100 mesh). In other words, all of the lime feed is ground together (lime and impurities), without any removal of particles during the grinding, until the batch of lime feed (both the lime and impurities) meets the desired particle size requirements. This continuous grinding is not surprising as the conventional wisdom is that small particles are better and, thus, the more the calcium oxide is grinded, the better.

Second, the quicklime meeting the desired size requirements is then fed into a hydrator, where the calcium oxide reacts with water (also known as slaking), and then quickly dried to form calcium hydroxide in accordance with the following equation:

$$CaO + H_2O \rightarrow Ca(OH)_2$$

Finally, the resultant calcium hydroxide (also known as hydrated lime) is then milled and classified until it meets a desired level of fineness and BET surface area.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

There are described herein, systems and methods for the use of highly reactive hydrated lime (HRH) in high temperature flue gas streams, namely those at greater than 400° F., such as are present before an air preheater (APH) to remove sulfur trioxide ($SO_3$) from the flue gas.

In an embodiment, there is described a system for removal of sulfur trioxide ($SO_3$) from a flue gas, the system comprising: a flue gas duct including, in downstream order, a selected catalytic reduction (SCR) system, an air preheater (APH), a particulate collector (such as, but not limited to, an electrostatic precipitator (ESP) or fabric filter baghouse (BH)), a flue gas desulfurization (FGD) unit (109), and an exhaust stack; and after the SCR and prior to the APH, an injection system for injecting a highly reactive lime hydrate (HRH) into the flue gas; wherein a temperature of the flue gas at the injection is greater than 400° F.

In an embodiment of the system, the temperature is greater than 550° F.

In an embodiment of the system, the temperature is greater than 600° F.

In an embodiment of the system, the HRH is injected at a rate of less than 1750 lb/hr and the $SO_3$ level of the flue gas at the APH is less than 45 ppm.

In an embodiment of the system, the HRH is injected at a rate of less than 1750 lb/hr and the $SO_3$ level of the flue gas at the APH is less than 25 ppm.

In an embodiment of the system, the HRH is injected at a rate of less than 1750 lb/hr and the $SO_3$ level of the flue gas at the APH is less than 20 ppm.

There is also described herein, in an embodiment, a method for removal of sulfur trioxide from a flue gas, the method comprising: providing a flue gas duct including, in downstream order, a selected catalytic reduction (SCR) system, an air preheater (APH), an electrostatic precipitator (ESP), a flue gas desulfurization (FGD) unit (109), and an exhaust stack (111); and after the SCR and prior to the APH, injecting a highly reactive lime hydrate (HRH) into the flue gas; wherein a temperature of the flue gas at the injection is greater than 400° F.

In an embodiment of the method, the temperature is greater than 550° F.

In an embodiment of the method, the temperature is greater than 600° F.

In an embodiment of the method, the HRH is injected at a rate of less than 1750 lb/hr and the $SO_3$ level of the flue gas at the APH is less than 45 ppm.

In an embodiment of the method, the HRH is injected at a rate of less than 1750 lb/hr and the $SO_3$ level of the flue gas at the APH is less than 25 ppm.

In an embodiment of the method, the HRH is injected at a rate of less than 1750 lb/hr and the $SO_3$ level of the flue gas at the APH is less than 20 ppm.

There is also described herein, in an embodiment, a system for removal of sulfur trioxide ($SO_3$) from a flue gas, the system comprising: a flue gas duct including, in downstream order, a selected catalytic reduction (SCR) system, an electrostatic precipitator (ESP), an air preheater (APH), a flue gas desulfurization (FGD) unit (109), and an exhaust stack; and after the ESP and prior to the APH, an injection system for injecting a highly reactive lime hydrate (HRH) into the flue gas; wherein a temperature of the flue gas at the injection is greater than 400° F.

In an embodiment of the system, the temperature is greater than 550° F.

In an embodiment of the system, the temperature is greater than 600° F.

In an embodiment of the system, the HRH is injected at a rate of less than 1750 lb/hr and the $SO_3$ level of the flue gas after injection is less than 45 ppm.

DETAILED DESCRIPTION OF THE PREFERRED EMBODIMENT(S)

Figure 1:
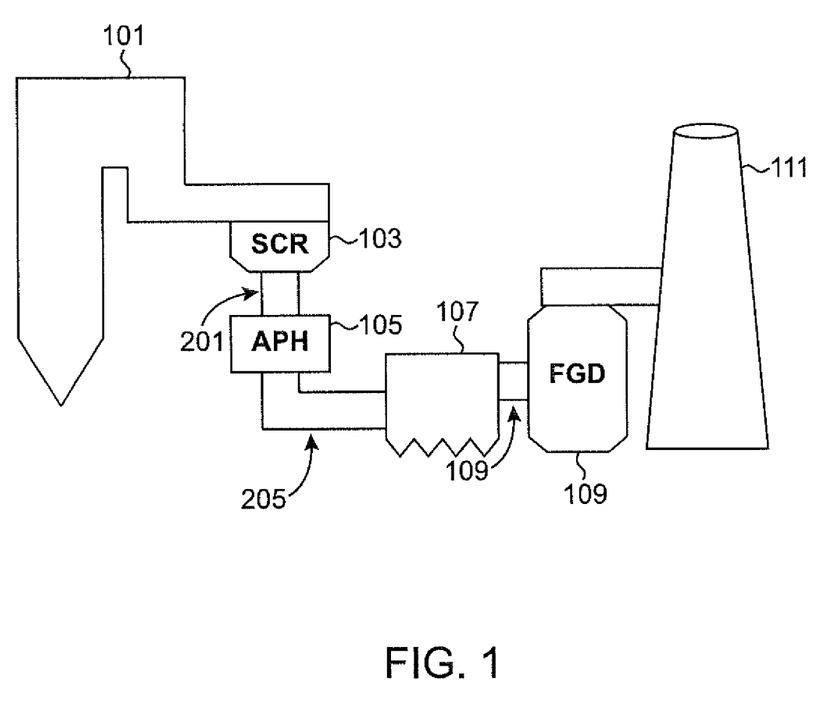
FIG. 1 provides a conceptual block diagram of an embodiment of a flue gas duct system as may be used in, for example, a coal fired power plant.

While most flue gas scrubbing systems are commonly focused on making sure that certain materials do not leave the flue stack and disperse in the air for environmental reasons, there are a number of benefits for removing $SO_3$ earlier in the process. FIG. 1 shows a loose block diagram of an arrangement of a flue gas duct system such as can be used in a coal fired power plant. Generally, major components include the boiler (101), a selected catalytic reduction (SCR) system for reducing $NO_x$ emissions (103), an air preheater (APH) (105), particulate collector (107) such as, but not limited to, a bag house or electrostatic precipitator (ESP), a Flue Gas Desulfurization (FGD) unit (109), and then the exhaust stack (111). Hydrated lime is typically injected after the APH (105) and prior to the ESP (107) at point (205), or prior to the FGD (109) at point (203) for $SO_3$ reduction. The latter is contemplated, for example, in U.S. Utility patent application Ser. No. 10/315,837, the entire disclosure of which is herein incorporated by reference. There is, however, indications that it would be desirable to provide treatment of flue gases prior to the APH (105) at point (201). In a first instance, such a location clearly provides for earlier (and therefore increased) corrosion protection from $SO_3$ interacting with components of the flue system downstream from the injection point (201). Secondly, earlier treatment provides capture of $SO_3$ prior to injection of a mercury sorbent. The presence of high amounts (greater than 5 ppm $SO_3$) at a mercury sorbent injection site will negatively affect the mercury capture rate of the sorbent, at an economic disadvantage. Further, a reduced $SO_3$ content in the flue gas at the APH (105) outlet (e.g. point (205)) allows the user to reduce the outlet temperature of the APH (105). This means that more heat can be recaptured in the APH (105) and returned to the boiler (101). This improves efficiency in the furnace (heat rate), offering a cost savings on fuel. A reduced fuel consumption for the same power generation (improved heat recapture), also creates a cascade effect of further reducing emissions as less $SO_3$ is generated in the first place.

One of the primary reasons to want to reduce $SO_3$ concentration earlier in the process is that controlling $SO_3$ prior to the APH (105) inlet at point (201) will reduce instances of forced outages for APH (105) cleaning due to Ammonium Bisulfate (AbS) buildup in the APH (105). Ammonia is typically injected in the SCR (103) for $NO_x$ reduction. However, lack of full efficiency at the SCR (103) and a desire to run a slight excess of ammonia generally yields excess ammonia (commonly referred to as "ammonia slip") in the flue gas exiting the SCR (103). This ammonia then reacts with $SO_3$ to produce ammonium bisulfate. While this reaction helps to reduce the acid gas concentration in the flue gas by reacting out $SO_3$, it creates an additional problem. Ammonium bisulfate is gaseous at temperatures prior to the APH. However, in the APH (105) the ammonium bisulfate will condense and solidify in the APH (105) internals as those internals cool. This will often form a sticky residue that clogs the APH (105), causes a pressure buildup, and eventually requires downtime for cleaning to allow for improved air passage.

However, injection of hydrated lime prior to the APH (105) is considered a high temperature injection (that is, greater than 400° F.) location which was seen as presenting its own concerns. As the purpose of the APH (105) is to recapture heat in the flue gas for improved efficiency, the flue gas entering an APH (105) is generally at a much higher temperature than that leaving the APH (105). Sorbent injections prior the APH (105) typically did not use hydrated lime, but focused on use of sodium bisulfate (soda ash) or trisodium hydrogendicarbonate dihydrate (trona), to insure that the reaction was complete prior to the gas going into the APH (103).

With the development of a highly reactive lime hydrate (HRH) with properties designed to significantly improve the speed of reaction with acid gases present in flue gas, it became a possibility that HRH may be useable at a high temperature injection point (201) prior to the APH (105). HRH can be manufactured in accordance with a number of processes, but is contemplated herein as material manufactured in accordance with, and having the properties discussed in, U.S. patent application Ser. Nos. 14/180,128 and 14/289,278, the entire disclosure of both of which is herein incorporated by reference. HRH is notably different from other hydrated lime as it has an improved removal rate of acidic pollutants present in the flue gas where the sorbent is delivered and the rate of removal is generally substantially higher. The use of a high purity, highly reactive hydrated lime such as HRH will have faster neutralization of acidic species.

While it may be provided in a variety of forms, in an embodiment, the HRH is a dry solid free of excess moisture. The product used may be described by having citric acid reactivity of less than 15 sec, preferentially less than 10 sec, optimally less than 7 sec. The product used may also be described by having available calcium hydroxide concentration of greater than 92% wt, preferentially greater than 94%, and optimally greater than 95%. The product used may also be described by having at least 90% of particles less than 10 microns, preferentially less than 8 microns. At least 50% of the particles are less than 4 microns, preferentially less than 3 microns. The product may also be described as having a BET surface area of at least 18 $m^2/g$, preferentially at least 19 $m^2/g$, 20 $m^2/g$, or 30 $m^2/g$.

HRH is generally used as part of dry sorbent injection system into the off gas of an industrial plant, incinerator, or boiler that combusts sulfur and/or halogenated fuels. The dry sorbent system consists of a storage silo, feed valve, and a means of conveyance of the product that could use pressurized gas or vacuum. The conveying gas/hydrate mixture is conveyed within a pipe and fed into the flue gas stream to be treated. There can be one or multiple feed points into the flue gas. The hydrated lime can be injected at temperatures below 2400° F. for capture of $SO_2$. The hydrated lime can be injected at temps below 1100° F. for capture of $SO_3$ and/or halogenated acids.

The reactivity enhancement of HRH is beneficial especially when the end user can capitalize on the hydrated lime's ability to rapidly neutralize the acid gases in flight, i.e., prior to forming a bed upon a bags of a fabric filter or plates of an electrostatic precipitator (ESP). This is commonly the case with injection prior to the APH (105). The use of high purity, highly reactive hydrated in high temperature (greater than 370° or 400° F.) applications leads to significantly improved neutralization of acidic components of flue gas. The removal rates are improved even when compared to the typical benefits seen when injecting high purity, highly reactive hydrated lime at lower temperatures (less than 370° F.).

In an exemplary embodiment, a coal fired boiler (101) equipped with an SCR (103), APH (105), ESP (107), and FGD (109) used hydrated lime to control $SO_3/H_2SO_4$ emissions. The unit was fed and evaluated using both HRH and conventional hydrated lime injected at the outlet of the SCR (103) and prior to the APH (105) (e.g. point (201)), where flue gas temperature generally averages greater than 600° F. A dew point monitor was used to determine the flue gas dew point, and by extension sulfuric acid/ammonia bisulfate content when using each of the different type of hydrated lime. At varying feed rates and varying unit loads, the HRH exhibited exceptional performance compared to the conventional (traditional) hydrated lime.

Figure 2:
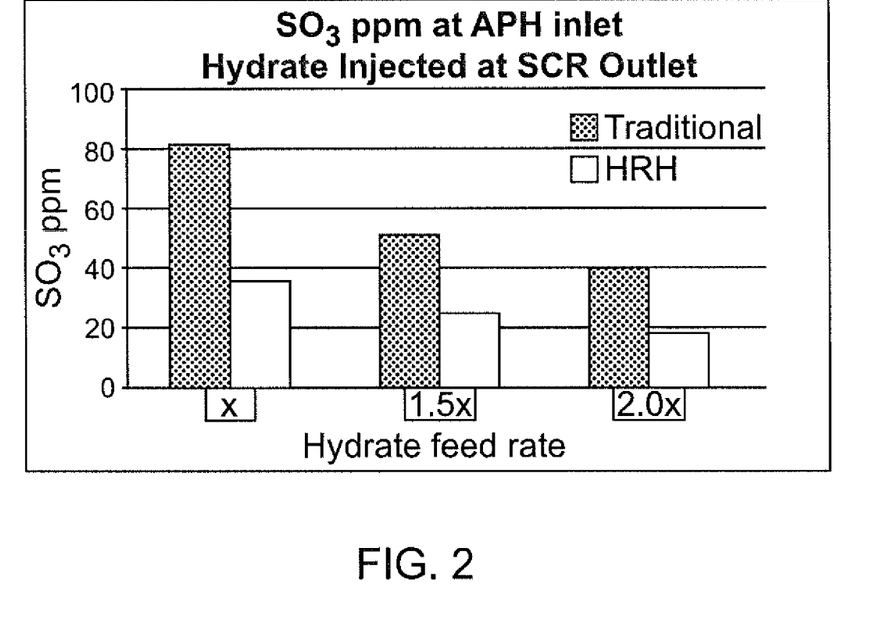
FIG. 2 provides a table illustrating increased reduction of $SO_3$ with a high reactivity lime hydrate compared to a more traditional hydrated lime composition.

The results are shown in FIG. 2 which makes apparent that at high temperatures (namely temperatures greater than 400° F. and preferably greater than 550° F.), there was an un-expectedly larger reduction in $SO_3$ than in cold (below 400° F.) applications. Use of HRH at a low temperature injection location, namely post APH (105) at point (205) where the temperature is less than 400° F., has been previously shown to provide for only a reduction of about 30% in use over conventional hydrated lime, while in the high temperature location the reduction could be more than double. These results are partially tabulated in Table 1 below which shows the different feed rates and relative reductions of $SO_3$:

TABLE 1

| Feed Rate | Traditional Hydrated Lime Average $SO_3$ | Standard Deviation of $SO_3$ (Traditional) | HRH Average $SO_3$ | Standard Deviation of $SO_3$ (HRH) |
| --- | --- | --- | --- | --- |
| Between 1250 and 1750 lb/hr | 49 ppm $SO_3$ | 20 | 23 ppm $SO_3$ | ±12 |
| Over 1750 lb/hr | 45 ppm $SO_3$ | 18 | 17 ppm $SO_3$ | ±8 |

HRH also appears to have a maximum in-flight removal of $SO_3$ within a short period of time specifically less than 3 seconds. Compared to conventional hydrate, near maximum reduction levels are attained within a much shorter time as illustrated in the following Table 2. Table 2 provides that the lime injection occurs at the SCR (103) outlet allowing the entire distance from the SCR (103) to the APH (105) to be used for reaction. The amount of $SO_3$ was then determined at the APH (105) inlet and at the APH (103) outlet indicating how much more reaction occurred in the APH (105).

TABLE 2

| Feed Rate | Additional Average $SO_3$ Removal APH inlet to APH outlet (Traditional) | Additional Average $SO_3$ Removal APH inlet to APH outlet (HRH) |
| --- | --- | --- |
| Less than 1250 lb/hr | 10 ppm $SO_3$ | 4 ppm $SO_3$ |
| Between 1250 and 1750 lb/hr | 31 ppm $SO_3$ | 8 ppm $SO_3$ |
| Greater than 1750 lb/hr | 33 ppm $SO_3$ | 5 ppm $SO_3$ |

The relatively small amount of additional reduction in $SO_3$ between the APH inlet and APH outlet when HRH is used indicates that HRH as a sorbent is significantly exhausted by the time it reaches the APH (105). Thus, the reaction time is completed substantially during the flue gas's presence between the SCR (103) and APH (105).

While not intending to be bound by any particular theory of operation, competing reactions with carbon dioxide and, to a lesser extent, $SO_2$ are believed to contribute to the loss in effectiveness of any hydrated lime in its targeted reaction with $SO_3$ which is being measured here, Additionally, the effectiveness of the sorbent conveying and flue gas distribution system factors into the amount of excess sorbent that is necessary to meet emissions targets. This is why the further reduction will likely never be zero. However, the data show that HRH is much more effective that traditional lime at reducing $SO_3$ concentration in high temperature or pre-APH (105) applications.

Figure 3:
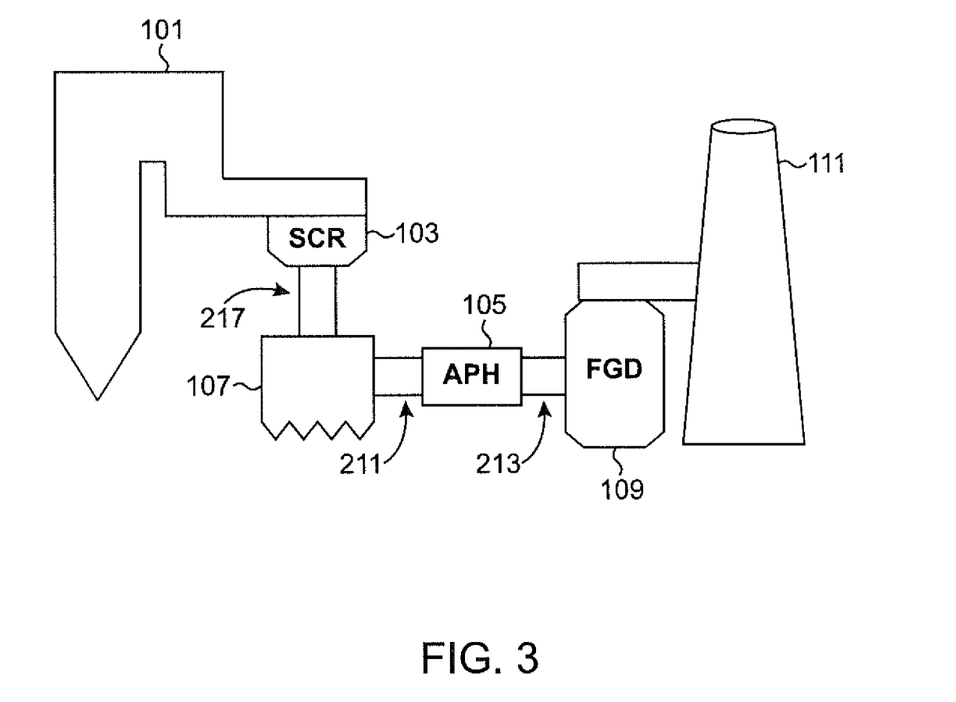
FIG. 3 provides a conceptual block diagram of an embodiment of a flue gas duct system using Hot-Side ESP as may be used in, for example, a coal fired power plant.

While the above has focused on a particular layout of flue gas duct components, FIG. 3 provides for an alternative arrangement of flue duct with the particulate collector (107) (generally an ESP in this arrangement) is positioned prior to the APH (105). This arrangement is often referred to as "Hot Side ESP". In this arrangement, the HRH will typically be injected at point (211) between the ESP as opposed to points (217) or (213) and is believed to provide for a similar unexpected reduction as contemplated above.

The use of HRH can also provide for reduced variation in sulfuric acid content of the flue gas. Coal-fired boilers experience fluctuations in $SO_3$ content based on a variety of factors, including coal sulfur content, SCR (103) catalyst variability, iron content of coal, and changes in load. These variations can cause significant swings in content of flue gas acids which may require additional downstream control mechanisms or overly conservative operating conditions and/or feed rates of the sorbents used to minimize the $SO_3$ levels.

HRH can also provide benefit where a user needs to achieve high level removal in a short time and does not have the luxury of a long duct run. This can be particularly valuable where there is co-injection with a mercury sorbent where $SO_3$ must be removed prior to the mercury sorbent, and in applications with a short residence time prior to a small ESP (e.g. where point (205) is part of a short duct).

If a site with a short residence at point (205) has to reduce acid gas to a predetermined level, a more reactive hydrate requires 10-30% less sorbent. In many cases, units have to feed a stoichiometric ratios well beyond equimolar (1 mole hydrated lime/1 mole $SO_3$) or even industry typical (3-5 mole hydrated lime/1 mole $SO_3$); as much as 6-10 mole hydrated lime/1 mole $SO_3$. A hydrate that is able to more effectively capture acid gas in a short span will reduce ash loading on the ESP from unreacted material.

While removal rates for traditional lime are generally constant across temperature ranges, HRH removal rates are unexpectedly better at high temperatures. While HRH is expected to have a better removal rate across residence times (as it is simply more reactive), comparatively the HRH removal rate performance difference increases as the residence time is reduced providing yet another unexpected result. Further, HRH is unexpectedly more efficient at low stoichiometry ratios as compared to traditional hydrated lime. Not only does the aggregate removal rate improve at high temperatures with the use of HRH as compared to traditional lime but the standard deviation of the remaining acid gas content is also reduced more than expected.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A method for removal of sulfur trioxide from a flue gas, the method comprising:
   providing a flue gas duct including, in downstream order, a selected catalytic reduction (SCR) system, an air preheater (APH), a particulate collector selected from the group consisting of: a fabric filter baghouse (BH) or an electrostatic precipitator (ESP), a flue gas desulfurization (FGD) unit (109), and an exhaust stack (111); and
   after said SCR and prior to said APH, injecting a dry highly reactive lime hydrate (HRH) into said flue gas;
   wherein said HRH has:
   an available calcium hydroxide concentration of greater than 92%;
   a D90 of less than or equal to 10 microns and greater than or equal to 4 microns in size;
   a ratio of D90 to D10 of less than 8; and
   said particles having a BET surface area of about 18 $m^2/g$ or greater;
   wherein a temperature of said flue gas at said injection is greater than 400° F.; and
   wherein said injection after said SCR and prior to said APH is the only injection of lime hydrate into said flue gas duct.

2. The method of claim 1 wherein said temperature is greater than 550° F.

3. The method of claim 1 wherein said temperature is greater than 600° F.

4. The method of claim 1 wherein said HRH is injected at a rate of less than 1750 lb/hr and the $SO_3$ level of the flue gas after injection is less than 45 ppm.

5. The method of claim 1 wherein said HRH is injected at a rate of less than 1750 lb/hr and the $SO_3$ level of the flue gas after injection is less than 25 ppm.

6. The method of claim 1 wherein said HRH is injected at a rate of less than 1750 lb/hr and the $SO_3$ level of the flue gas after injection is less than 20 ppm.

7. The method of claim 1 wherein the ratio is less than about 6.

8. The method of claim 1 wherein the ratio is between about 4 and about 7.

9. The method of claim 1 wherein the ratio is between about 5 and about 6.

10. The method of claim 1 wherein the D90 is less than or equal to about 8 microns and greater than or equal to about 4 microns.

11. The method of claim 1 wherein the D90 is less than or equal to about 6 microns and greater than or equal to about 4 microns.

12. The method of claim 1 wherein the D90 is less than or equal to about 5 microns and greater than or equal to about 4 microns.

13. The method of claim 1 wherein the particles have a BET surface area of about 20 $m^2/g$ or greater.

14. The method of claim 1 wherein a D50 less than or equal to about 4 microns.

15. The method of claim 1 wherein a D50 less than or equal to about 2 microns.

16. A method for removal of sulfur trioxide from a flue gas, the method comprising:
   providing a flue gas duct including, in downstream order, a selected catalytic reduction (SCR) system, an air preheater (APH), a particulate collector selected from the group consisting of: a fabric filter baghouse (BH) or an electrostatic precipitator (ESP), a flue gas desulfurization (FGD) unit (109), and an exhaust stack (111); and
   after said SCR and prior to said APH, injecting a dry lime hydrate into said flue gas;
   wherein said HRH has:
   an available calcium hydroxide concentration of greater than 92%;
   a D90 of less than or equal to 10 microns and greater than or equal to 4 microns in size;
   a ratio of D90 to D10 of a less than 8; and
   said particles having a BET surface area of about 18 $m^2/g$ or greater;
   wherein a temperature of said flue gas at said injection is greater than 400° F.; and
   wherein said lime hydrate reacts with $SO_3$ in-flight in said flue gas duct prior to said particulate collector; and
   wherein said lime hydrate reacts with SO3 in-flight in said flue gas duct prior to said particulate collector; and
   wherein said lime hydrate injected after said SCR and prior to said APH is the only injection of lime hydrate into said flue gas duct and is injected at a rate of less than 1750 lb/hr and the SOs level of the flue gas prior to the particulate collector is less than 45 ppm.

17. The method of claim 16 wherein said temperature is greater than 550° F.

18. The method of claim 16 wherein said $SO_3$ level of the flue gas prior to the particulate collector is less than 20 ppm.

* * * * *

UNITED STATES PATENT AND TRADEMARK OFFICE
CERTIFICATE OF CORRECTION

PATENT NO. : 11,311,839 B1
APPLICATION NO. : 14/846484
DATED : April 26, 2022
INVENTOR(S) : Biehn et al.

It is certified that error appears in the above-identified patent and that said Letters Patent is hereby corrected as shown below:

In the Claims

Column 10, Line 47 should read -- a ratio of D90 to D10 of less than 8; and --.

Column 10, Line 59 should read -- than 1750 lb/hr and the SO3 level of the flue gas prior --.

Column 10, Lines 27-28 should read -- The method of claim 1 wherein a D50 is less than or equal to about 4 microns --.

Column 10, Lines 29-30 should read -- The method of claim 1 wherein a D50 is less than or equal to about 2 microns --.

Signed and Sealed this
Third Day of December, 2024

Katherine Kelly Vidal
*Director of the United States Patent and Trademark Office*